United States Patent [19]

Darlington

[11] Patent Number: 4,820,379
[45] Date of Patent: Apr. 11, 1989

[54] METHOD FOR DEINKING WASTEPAPER WITH A HALOGENATED POLYETHYLENE OXIDE AND A POLYMERIC MATERIAL

[75] Inventor: William B. Darlington, Wadsworth, Ohio

[73] Assignee: PPG Industries, Inc., Pittsburgh, Pa.

[21] Appl. No.: 188,948

[22] Filed: May 2, 1988

Related U.S. Application Data

[63] Continuation-in-part of Ser. No. 919,513, Oct. 16, 1986, abandoned.

[51] Int. Cl.$^4$ .............................................. D21C 5/02
[52] U.S. Cl. ........................................... 162/5; 162/6; 162/55
[58] Field of Search ............................ 162/5, 158, 55, 6

[56] References Cited

U.S. PATENT DOCUMENTS

| | | | |
|---|---|---|---|
| 3,426,077 | 2/1969 | Eiseman et al. | 568/614 |
| 4,162,186 | 7/1979 | Wood et al. | 162/5 |
| 4,276,118 | 6/1981 | Quick | 162/5 |
| 4,347,099 | 8/1982 | DeCeuster et al. | 162/5 |
| 4,376,011 | 3/1983 | Menschhorn et al. | 162/5 |
| 4,487,655 | 12/1984 | Noetzel et al. | 162/5 |
| 4,518,459 | 5/1985 | Freis et al. | 162/5 |
| 4,561,933 | 12/1985 | Wood et al. | 162/5 |
| 4,618,400 | 10/1986 | Wood et al. | 162/5 |
| 4,643,800 | 2/1988 | Maloney et al. | 162/5 |

FOREIGN PATENT DOCUMENTS

| | | | |
|---|---|---|---|
| 58-109696 | 12/1981 | Japan | 162/5 |
| 59-155990 | 7/1982 | Japan | 162/5 |
| 2063326 | 6/1981 | United Kingdom | 162/5 |

OTHER PUBLICATIONS

1985 TAPPI Pulping Conference Proceedings, pp. 561–566.
1987 TAPPI Pulping Conference Proceedings, pp. 33–40.
1987 TAPPI Pulping Conference Proceedings, pp. 133–142.

Primary Examiner—Karen Hastings
Attorney, Agent, or Firm—Edward J. Whitfield

[57] ABSTRACT

The present invention relates to a method of removing ink from secondary fiber by contacting a pulp of said secondary fiber with an aqueous medium in the presence of a polymeric material having a glass transition temperature in the range of from about 20° C. to about 70° C. and a substituted polyethylene oxide to agglomerate the ink into discrete masses and separating the agglomerated ink from the pulp-containing aqueous medium.

8 Claims, No Drawings

METHOD FOR DEINKING WASTEPAPER WITH A HALOGENATED POLYETHYLENE OXIDE AND A POLYMERIC MATERIAL

CROSS-REFERENCE TO RELATED APPLICATION

This application is a continuation-in-part of application Ser. No. 919,513 filed Oct. 16, 1986, now abandoned.

FIELD OF THE INVENTION

The present invention relates to a method of removing ink from secondary fiber by contacting a pulp of said secondary fiber with an aqueous medium containing polymeric material having a glass transition temperature in the range of from about 20° C. to about 70° C. and substituted polyethylene oxide compound to agglomerate the ink into discrete masses and separating the agglomerated ink from the pulp-containing aqueous medium.

BACKGROUND OF THE INVENTION

Secondary fiber has long served as a source of raw fiber material in papermaking. The recycling of secondary fiber continues to increase. Secondary fiber must be processed to remove the ink to permit the manufacture of high quality paper. For years paper was printed with primarily water or oil-based inks which were satisfactorily removed by conventional deinking procedures. In conventional deinking procedures, secondary fiber is mechanically pulped and contacted with an aqueous medium containing a surfactant. The mechanical pulping and the action of the surfactant result in separation of the ink from the pulp fibers. The dispersed ink is then separated from the pulp fibers by processes such as washing or flotation.

Increasing amounts of secondary fiber are generated from reprographic printing processes such as electrophotographic copying, e.g., xerography, and nonimpact printing, e.g., laser or ink-jet printing. The difficulty in the deinking of xerographically printed secondary fiber has been attributed to the binder of the xerographic ink, which is different from those in common oil-based inks. The xerographic-ink binder is typically a polymeric material which is thermally fixed to the paper. Xerographic-ink binders are not easily dispersed by commonly used surfactants such as nonylphenol ethoxylate. As a result, paper produced from xerographic secondary fiber has a high dirt count, i.e., the paper contains visible ink particles and is a lower grade product.

Often reprographic processes, such as xerography, utilize magnetic inks or magnetic toners. Such magnetic ink also generally includes a polymeric binder that is not effectively removed by conventional deinking procedures. The increasing abundance of secondary fiber containing magnetic ink has made the reclamation of such secondary fiber economically attractive. Yet, the inability to remove magnetic ink from secondary fiber has limited the recycle of such secondary fiber to low-grade paper products.

It is therefore the principal object of this invention to provide a method of deinking secondary fiber printed by reprographic printing processes to provide a deinked pulp suitable for producing paper comparable in quality to paper prepared from virgin pulp.

DESCRIPTION OF THE INVENTION

This invention provides a method of deinking secondary fiber printed by reprographic processes or a mixture of secondary fiber printed by reprographic processes and secondary fiber printed by nonreprographic processes by pulping the secondary fiber and contacting the pulp with an aqueous medium containing polymeric material having a glass transition temperature in the range of from about 20° C. to about 70° C. and a compound or mixture of compounds of the Formula I:

$$R(OCH_2CH_2)_nR^1 \qquad (I)$$

wherein:

R is $C_6$ to $C_{20}$ linear or branched alkyl;

$R^1$ is selected from halogen, phenoxy, $C_1$ to $C_4$ alkoxy or $-O(C_mH_{2m}O)_pH$ wherein m is 3 or 4 and p is 1 to 5; and n denotes the average number of ethylene oxide units and is a whole or fractional number ranging from 1 to 20.

Preferred compounds of the Formula I are those wherein R is $C_{10}$ to $C_{15}$ linear or branched alkyl, $R_1$ is phenoxy or halogen, especially chlorine or bromine, and n is a whole or fractional number ranging from 3 to 12.

Preparation of the Formula I compounds wherein $R^1$ is halogen is described for example, in copending commonly owned U.S. application Ser. No. 720,000 filed Apr. 4, 1985 now U.S. Pat. No. 4,622,431, and U.S. application Ser. No. 891,096 filed July 31, 1986 the teachings of which are incorporated by reference herein. Formula I compounds wherein $R^1$ is other than halogen, may be readily prepared by reacting the Formula I halide with a compound of the formula $M-OR^1$ when M is alkali metal, e.g., sodium or potassium, and $R^1$ is as defined hereinabove with the exception of halogen.

Suitable polymeric materials for use in accordance with this invention are for example, polystyrene or a styrene-carboxylic acid copolymer.

The styrene-carboxylic acid copolymer is one having a styrene content of at least about 50 weight percent, preferably from about 60 to about 80 weight percent and a glass transition temperature in the range of from about 20° C. to about 70° C., preferably from about 25° C. to about 50° C. Preferred styrene-carboxylic acid copolymers are styrene-acrylate copolymers such as, for example, styrene-methyl acrylate, styrene-ethyl acrylate, styrene-butyl acrylate and styrene 2-ethylhexyl acrylate, the latter being particularly preferred. The styrene-acrylate copolymers preferred for use in accordance with this invention are commercially available or can be prepared using techniques well-known to the art.

Polystyrene suitable for use in accordance with the invention is one also having a glass transition temperature in the range of from about 20° C. to about 70° C. and preferably from about 25 ° C. to about 50° C.

More particularly this invention comprises the steps of reducing secondary fiber to pulp, contacting the pulp with an aqueous alkaline medium containing the polymeric material and Formula I compound for a time sufficient to agglomerate the ink particles and separating the agglomerated ink particles from the pulp-containing aqueous alkaline medium.

Pulping of the secondary fiber may be effected using any conventional process and apparatus. Typically secondary fiber is treated in a so called hydropulper which produces an aqueous slurry of paper fibers. Such pulp slurries typically contain from about 3 to about 20 percent by weight and usually from about 4 to about 8 percent by weight of paper fiber basis dry weight of secondary fiber relative to the total weight of slurry. Contacting the pulp with an aqueous medium containing the polymeric material and Formula I compound may be conveniently effected in the pulping apparatus by merely adding the polymeric material and the Formula I compound to the fiber slurry. The pH of the fiber slurry may be acid, neutral or alkaline and is adjusted by addition of acid or base.

Although contact of the pulp with the aqueous medium containing polymeric material and Formula I compound may be conducted at ambient temperature, preferably a moderately elevated temperature, e.g., from about 40° C. to about 90° C., is employed. A contact temperature in the range of from about 45° C. to about 75° C. appears to provide optimal results.

The pulp is contacted with the aqueous medium containing polymeric material and Formula I compound for a time sufficient to agglomerate the ink particles into discrete masses or globules. Depending on the ink loading on the secondary fiber, contact time may vary from as little as ten minutes up to about an hour, although for most applications a contact time in the range of from about 15 to about 45 minutes should provide satisfactory results.

The ink globules typically range from about 2 to 5 millimeters or more in diameter and are readily removed from the pulp-containing aqueous medium by any conventional means, e.g., centrifugation, flotation, sedimentation, filtration or the like. Since the invention process is also applicable to secondary fiber printed with magnetic ink, such ink agglomerates may also be removed by magnetic separation means.

Not to be bound by any particular theory, it is believed the Formula I compound interacts with the polymeric material so as to effectively reduce its glass transition temperature so that the surface energy of the polymeric particles is reduced and they become semi-liquid and tacky at the pulping temperature. The tacky particles attract ink and toner particles in the pulp slurry forming large agglomerates that can be cleanly separated from the pulp fibers.

The amount of Formula I compound used typically ranges from about 0.1 percent to about 1.5 percent and usually from about 0.3 percent to about 1.0 percent by weight basis total weight of dry secondary fiber undergoing treatment.

The polymeric material is typically present in quantity ranging from about 0.1 percent to about 2.0 percent and usually from about 0.5 percent to 1.5 percent by weight basis total weight of dry secondary fiber undergoing treatment. Certain electrophotographic inks contain as a binder, a styrene-acrylate copolymer contemplated for use in accordance with the invention. For example, the toner used in Savin copier Models 7010 and 7015 was analyzed by a combination of thermal and infrared techniques and found to contain 49 wt-% of a copolymer of 80 wt-% styrene/20 wt-% 2-ethylhexyl acrylate, 38 wt-% magnetite and 13 wt-% carbon black. When secondary fiber printed with such ink is used, the secondary fiber itself becomes the source of the styrene-acrylate polymer. If at least about 20 weight percent (dry basis) of the total amount of secondary fiber undergoing treatment is printed with ink containing a suitable styrene-acrylate polymer, then separate addition of polymeric material to the pulp slurry may be dispensed with.

It is of course to be understood that the method of this invention may be practiced batchwise or continuously. Also, the aqueous pulp contact medium may contain other additives commonly used in deinking operations, e.g., surfactants, bleaches, brighteners, softeners, defoamers, dispersants, chelating agents and the like, as well as other conventionally used deinking agents, e.g., ethoxylated alkanols, such as the nonylphenol ethoxylates described in U.S. Pat. No. 4,162,186.

The method of this invention is further illustrated, but it is not intended that it be limited by the following Examples.

EXAMPLE I

The secondary fiber used in these Examples were 8 ½ × 11 inch (21.59 × 27.94 cm.) sheets copied on one side with a uniform test pattern generated by a Hewlett-Packard laser printer.

(A) The test pattern was copied onto one set of sheets using a Savin 7010 copier employing an ink or toner containing 49 wt-% of an 80 wt-%/20 wt-% styrene/2-ethylhexyl acrylate copolymer, 38 wt-% magnetite and 13 wt-% carbon black. Each printed sheet contained 3.3 wt-% of toner.

(B) The test pattern was copied onto another set of sheets using an IBM Series III, Model 60 copier employing an ink or toner containing 60–70 wt-% polymethylmethacrylate, 10–20 wt-% nylon and 20 wt-% carbon black. Each printed sheet contained 1.3 wt-% toner.

The uncopied, i.e., blank test sheets had an average brightness of 84–85% ISO determined in accordance with the Technical Association of the Pulp and Paper Industry (TAPPI) method T-217 and an average dirt count of 9 square millimeters per square meter ($mm^2/M^2$) determined in accordance with TAPPI method T-437 pm-78. These methods were used to evaluate brightness and dirt count on all paper samples treated in this Example and the following examples.

EXAMPLE II

This Example, illustrates deinking of secondary fiber in accordance with one embodiment of the method of this invention, using a Formula I compound wherein R is a mixture of $C_{10}$ to $C_{15}$ straight chain alkyls, n is 9 and $R^1$ is chlorine which compound is represented by the formula:

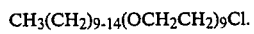

$CH_3(CH_2)_{9-14}(OCH_2CH_2)_9Cl$.

A number of runs were made using varying weight ratios of test sheets printed with ink (A) containing styrene-acrylate copolymer and test sheets printed with ink (B) as described in Example I. Pulp slurry preparation was done substantially in accordance with TAPPI Useful Method 204, except that no bleach was added to the pulp slurry. With minor variations, the procedure used in each test run was as follows.

About 9.1 to 9.5 grams of test sheets were torn into 1-inch (2.54 cm) squares and charged to a beaker containing 400 milliliters of warm water, the pH of which was adjusted in the range of from about 10 to 11 with sodium hydroxide. After soaking for about 30 minutes to an hour the mixture was transferred to a Waring blender and mixed at high speed for 20 to 30 seconds. The slurry was transferred to the beaker and heated, with continuous stirring, to a temperature in the range of 60° to 80° C. Varying amounts of Formula I compound were added in the form of a one percent aqueous solution to provide from 0.1 to 0.5 percent by weight of Formula I compound basis dry weight of paper. The alkaline pulp slurry containing the Formula I compound was stirred until the ink particles had noticeably agglomerated into discrete masses, the contact time ranging from about 10 to about 45 minutes. After agglomeration of the ink particles, the pulp slurry was diluted with water to a volume of about 4 liters and the agglomerated ink was removed by means of a cobalt-samarium magnet. (Alternatively, the agglomerated ink could just as readily have been removed by conventional centrifugation, filtration, flotation, sedimentation, decantation or washing means.) The deinked pulp slurry was then passed through a 60 mesh screen and the drained pulp was reslurried in 4 liters of water. The screening and reslurrying step was repeated and the resulting pulp slurry was made into a handsheet by passing the same through a Buchner funnel in accordance with TAPPI method T-218om-83. Brightness and dirt count of the finished handsheet were then determined in accordance with the TAPPI methods mentioned in Example I.

The following Table summarizes the results of eight runs wherein:

A is the wt. % of magnetic ink printed paper in the pulp;

B is the wt. % of non-magnetic ink printed paper in the pulp;

I is the wt. % of Formula I compound used basis total dry weight of paper;

t is the contact time, in minutes, between the pulp slurry and Formula I compound;

T is the contact temperature in °C;

E is the brightness of the handsheet in % ISO; and

D is the dirt count of the handsheet in $mm^2/M^2$.

| Run | A | B | I | t | T | E | D |
| --- | --- | --- | --- | --- | --- | --- | --- |
| 1 | 100 | 0 | 0.5 | 28 | 75 | 85.1 | 115 |
| 2 | 50 | 50 | 0.3 | 15 | 70 | 85.7 | 300 |
| 3 | 50 | 50 | 0.5 | 25 | 75 | 82.1 | 21 |
| 4 | 37.5 | 62.5 | 0.5 | 38 | 65–75 | 84.8 | 28 |
| 5 | 25 | 75 | 0.5 | 40 | 69–75 | 86.9 | 24 |
| 6 | 14.6 | 75.4 | 0.5 | 44 | 63–79 | 84.9 | 8 |
| 7 | 8.3 | 91.7 | 0.1 | 38 | 67–73 | 84.0 | 340 |
| 8 | 6.2 | 93.8 | 0.5 | 46 | 62–75 | 86.0 | 250 |

EXAMPLE III

A mixture of 23.2 grams of test paper B, 400 milliliters of deionized water and 10 milliliters of aqueous calcium chloride solution containing 11.76 g/l of $CaCl_2 2H_2O$ was mixed in a Waring blender for 25 seconds. The pulp slurry was transferred to a 600 milliliter beaker and the pH was adjusted to 10.5 with dilute sodium hydroxide solution. The stirred slurry was heated to about 36° C. and 0.03 grams of the Formula I compound used in Example II was added. The temperature was increased to 75° C. and the pulp slurry was vigorously stirred for one hour. The slurry was then diluted to 4 liters and fabricated into handsheets. Due to excessive calcium precipitation, the ink particles in the handsheets were quite small, having an average area of less than 0.02 $mm^2$; the handsheets having a brightness of 73.8% ISO.

EXAMPLE IV

A mixture of 121.0 grams of test paper B, 120.47 grams of test paper A were pulped with 4000 milliliters of deionized water in an Adirondack Machine Co. 2-gallon pulper. The pulp slurry also contained 19.38 grams of 50% sodium hydroxide solution, 2.03 grams of Bayhibit ® AM (a 50% solution of 2-phosphonobutane-1,2,4-tricarboxylic acid from Mobay Chemical Co.) and 0.70 gram of the Formula I compound used in Examples II and III. After pulping for one hour at 75° C., handsheets made from pulp had a brightness of 83.6% ISO; the ink particles contained therein had an average area of about 1.9 $mm^2$.

EXAMPLE V

A styrene-acrylate copolymer latex was prepared by blending 6 grams of Pliotone ® 2503 (product of Goodyear Corp.) in 100 milliliters of a 1% aqueous solution of the 9-ethoxylate of nonylphenol. To a 600 milliliter beaker were charged 27.83 grams of test paper B, 400 milliliters of deionized water, 30 milliliters of Bayhibit ® AM inhibitor, 3.0 grams of the Pliotone ® 2503 latex, 0.25 gram of Callaway hydrophobic silica defoamer (product Callaway Chemical Co.) and 0.03 gram of the Formula I compound used in the preceding Examples. The pH of the resulting slurry was adjusted to 10.5 by addition of dilute aqueous sodium hydroxide solution, heated to 75° C. and vigorously stirred for 40 minutes. The pulp slurry was then diluted to 4 liters and made into handsheets. The ink particles in the handsheets were as large as 0.8 $mm^2$ and the handsheets had a brightness of 77.1% ISO.

EXAMPLE VI

A charge of 275 pounds of laser-printed computer printout waste paper was added to 270 gallons of tap water containing 210 ppm calcium carbonate hardness. This mixture was mixed in a pulper with a helical rotor. The pH of the pulp mixture was adjusted to 10.3 with the addition of 582.6 grams of sodium hydroxide. The initial temperature of the pulp mixture was 86° F. and was gradually increased by direct injection of steam into the pulper. After three minutes, the temperature had increased to 107° F., and a mixture containing 624 grams of −28 mesh A-75 Picolastic polystyrene (Hercules Incorporated, Wilmington, DE) dispersed in 5 gallons of water containing 316.8 grams of Wetsan-225 (Santek Chemicals, Appleton, WI) was added.

After 10 minutes, the temperature of the pulp had increased to 133° F., and 389.5 grams of a mixture of 95% of the Formula I compound used in Example II and 5% of Dequest 2010 (1-hydroxyethane,1,1-diphosphonic acid from Monsanto Chemical Corp., St. Louis, MO) was added. After 24 minutes of pulping, the temperature was 138° F. and 171.2 grams of Foambrake SC-52 (a defoamer obtained from Santek Chemicals, Appleton, WI) was added. Pulping was continued for a total of 45 minutes while maintaining the temperature of 138–141° F.

Samples of the pulp were taken periodically during the pulping and used to prepare hand sheets on a Nobel and Wood sheet machine. The growth of the agglomerated toner particles was apparent during the pulping. Before any chemicals were added, the toner particles in the dispersion were generally less than 0.1 mm in diameter. After five minutes of pulping, the particles had grown in size and many were 0.5 mm in diameter. After 25 minutes of pulping, many of the particles had grown to 1–2 mm in diameter. Further growth of the toner particles occurred and was evident at the end of the 40 minutes of pulping.

After pulping, the contents of the pulper were pumped to a storage chest and diluted to 3% consistency (i.e. 3% dry paper in water) and pumped through a slotted-screen cleaner with 0.014 inch wide slots. The pressure drop across the screen was 10 pounds per square inch. The rejects consisted of 14–18% of the feed.

The accepts from the slotted-screen cleaner were further diluted to 0.7% consistency and fed through a 3-inch Bauer centrifugal cleaner. At a feed rate of 20 gallons per minute the pressure drop was 32 pounds per square inch. The reject rate was 12–14%.

The accepts from the centrifugal cleaner were used to prepare handsheets on a Nobel and Wood sheet machine. These sheets had a brightness of 74.8% ISO compared to 75.3% ISO on unprinted areas of the original waste paper. The dirt count of the accepts from the centrifugal cleaner was less than 5 $mm^2/M^2$. The ash content of the accepts from the centrifugal cleaner was 1.4% compared to 9.8% for the original paper.

As the foregoing results clearly show, the method of this invention enables preparation of paper products of quite high quality from secondary fiber printed with electrophotographic inks and although the invention has been described in considerable detail herein, it is to be appreciated that many variations may be made therein by one skilled in the art without departing from the spirit and scope thereof.

I claim:

1. A method of removing ink from secondary fiber, said method comprising the steps of:
   (a) pulping the secondary fiber containing ink in an aqueous medium in the presence of a polymeric material having a glass transition temperature in the range of from about 20° C. to 70° C. degrees centigrade;
   (b) contacting the pulped secondary fiber with a compound or mixture of compounds represented by the formula:

$$R(OCH_2CH_2)_n R^1$$

wherein:
   R is $C_6$ to $C_{20}$ linear or branched alkyl;
   $R^1$ is halogen, and n denotes the average number of ethylene oxide units and is a whole or fractional number ranging from 1 to 20, said polymeric material and said compound being present in an amount sufficient and for a time sufficient to agglomerate the ink into discrete masses; and
   (c) separating the agglomerated ink from the pulp-containing aqueous medium.

2. The method of claim 1 wherein the compound is one wherein R is $C_{10}$ to $C_{15}$ linear or branched alkyl; and n is a whole or fractional number ranging from 3 to 12.

3. The method of claim 2 wherein the compound is represented by the formula:

$$CH_3(CH_2)_{9-14}(OCH_2CH_2)_9Cl.$$

4. The method of claim 1 wherein the polymeric material is polystyrene or styrene-carboxylic acid copolymer.

5. The method of claim 4 wherein said polymeric material is styrene-carboxylic acid copolymer and the styrene-carboxylic acid copolymer is a styrene-acrylate copolymer.

6. The method of claim 5 wherein the styrene-acrylate copolymer is a copolymer of styrene and 2-ethylhexyl acrylate.

7. The method of claim 1 wherein the aqueous pulping medium contains a chelating agent to inhibit calcium precipitation.

8. The method of claim 1 wherein the aqueous pulping medium contains a defoaming agent.

* * * * *